Oct. 18, 1932.  J. M. BENJAMIN  1,882,748
CONTROLLING MECHANISM
Original Filed Aug. 1, 1923
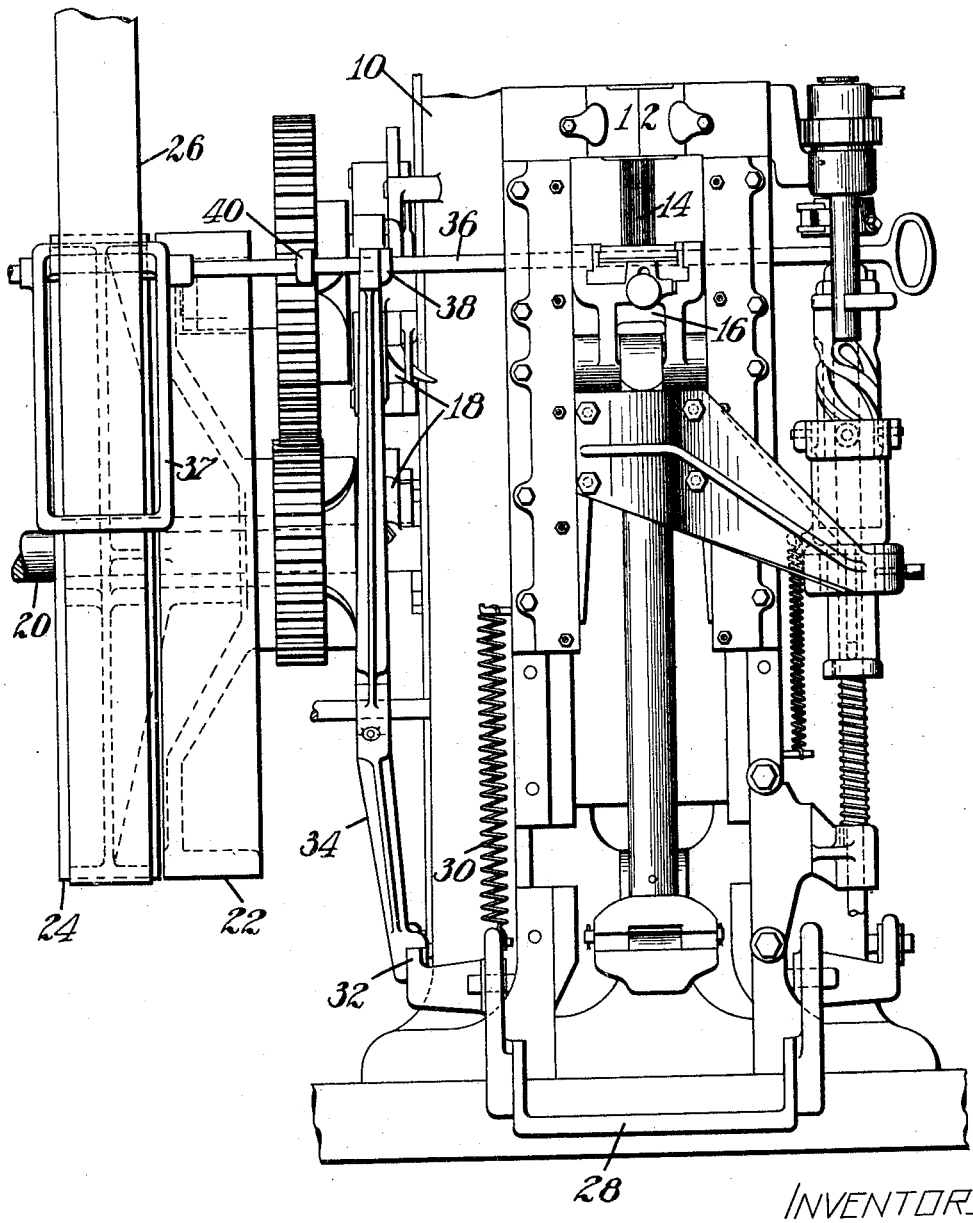
INVENTOR
John M. Benjamin
By his Attorney,
Nelson W. Howard Patented Oct. 18, 1932

1,882,748

UNITED STATES PATENT OFFICE

JOHN M. BENJAMIN, OF BEVERLY, MASSACHUSETTS, ASSIGNOR TO UNITED SHOE MACHINERY CORPORATION, OF PATERSON, NEW JERSEY, A CORPORATION OF NEW JERSEY

CONTROLLING MECHANISM

Original application filed August 1, 1923, Serial No. 655,097. Divided and this application filed December 21, 1929. Serial No. 415,862.

My invention relates to controlling mechanism, it being especially applicable to the driving mechanisms of various machines, for example those for attaching heels to shoes. The present case is a division of the application filed in the United States Patent Office in my name on August 1, 1923, it bearing the Serial No. 655,097, and which on April 14, 1931 became Patent No. 1,800,205.

With certain forms of driving or power-transmitting means in which is included such a clutch as that disclosed in Letters Patent of the United States No. 1,447,261, Mayo, March 6, 1923, actuation of the treadle or other starting member of the machine so displaces the co-operating clutch-parts that, unless the driving force is at the time available, they must be repositioned before the machine can be started. An object of this invention is to guard against disturbance of the normal relation of the power-transmitting elements unless the driving force is ready for application. This object I attain by combining with driving means, which may include in the chain of driving connections a clutch, a means rendering said driving means effective or ineffective for the operation of the associated machine, a member, as a treadle, movable by the operator to control the operation of the machine while the driving means continues in operation, and means for locking the controlling member against movement when the driving means is ineffective. In the disclosed embodiment of the invention, the driving means includes a member, which may be a driving belt, movable to determine its activity or inactivity, it being shown as carried by a shifter between fast and loose pulleys, the fast pulley operating the clutch. The clutch is controlled by the treadle, and this treadle is locked against movement through connections to the belt-shifter when the belt is on the loose pulley. Therefore, the machine cannot be started. When the belt is upon the fast pulley, the treadle is freed from the locking connections and the machine may be put into action.

The accompanying drawing shows in front elevation the lower portion of a heel-attaching machine to which one form of my invention is applied.

The heel-attaching machine in connection with which I have chosen to illustrate this invention may be as in the Mayo patent previously mentioned. There is mounted upon a frame 10 a die-block 12, with openings of which co-operate drivers 14 carried by a reciprocatory cross-head 16 and acting when raised to insert the attaching nails through a heel into the heel-seat of a shoe to which it is to be secured. Vertical movement is imparted to the drivers, to force them against the attaching nails for their insertion in the work, by connecting elements including clutch mechanism 18 associated with a driving shaft 20, which carries a fast pulley 22 and a loose pulley 24 connected by a belt 26 to a source of power. A treadle 28, pivoted at the bottom of the frame, is joined to the clutch mechanism, a depression of the treadle causing its engagement for a single cycle of operation of the machine.

Certain clutch mechanisms, as that disclosed by Mayo, are so organized that, if the member which controls them, as the treadle 28, is actuated when the machine is not in operation, the clutch is released and assumes an abnormal position, in which the apparatus cannot be started until it has been brought back to normal by some such act as turning it over with a bar. To avoid this difficulty, I associate with the driving mechanism means for locking the treadle at all times other than when the clutch can be engaged properly. The treadle is held normally raised to release the clutch by a spring 30 extending between said treadle and the frame. Projecting from one side of the treadle is an arm 32 horizontally alined with a recess in the side of a lever 34 fulcrumed upon the frame and having an opening through which passes a rod 36 for actuating a belt-engaging member 37 to shift the driving belt 26 upon the pulleys 22 and 24 between active and inactive positions. Fixed upon this rod, at opposite sides of the lever 34, are contact members 38 and 40. When the belt is upon the loose pulley 24 and the machine is out of operation, the contact member 38 bears against the lever and holds the lower end of the latter so the recess receives the arm 32, locking the treadle against depression. When the rod is moved to the right to bring the belt to the fast pulley 22, the member 40 contacts with the lever, carrying the recess clear of the arm 32, so that, the machine now being in condition for operation, the treadle is freed for depression. As a result of these connections, accidental displacement of the treadle or the tampering with it by unauthorized persons cannot cause the throwing of the clutch mechanism and its controlling elements out of operative relation.

Having described my invention, what I claim as new and desire to secure by Letters Patent of the United States is:

1. The combination with a machine to be driven, of driving means therefor, means for rendering said driving means effective or ineffective for the operation of the machine, a member movable by the operator to control the operation of the machine while the driving means continues in operation, and means for locking the controlling member against movement when the driving means is ineffective.

2. The combination with a machine to be driven, of a driving member movable between active and inactive positions, a member movable by the operator to produce a single operating cycle of the machine, and means for locking the last mentioned member against movement when the driving member is in inactive position.

3. The combination with a machine to be driven, of a driving member, means for shifting the driving member between active and inactive positions, a member movable by the operator to produce a single operating cycle of the machine, and means governed by the shifting means for locking the last mentioned member.

4. The combination with a machine to be driven, of fast and loose pulleys, a driving belt co-operating with said pulleys, a belt-shifter, clutch mechanism operable from the fast pulley and through which the machine is driven, a treadle for controlling the clutch mechanism, and connections between the belt-shifter and treadle arranged to govern one of the elements furnished by said belt-shifter and treadle.

5. The combination with a machine to be driven, of fast and loose pulleys, a driving belt co-operating with said pulleys, a belt-shifting rod having separated contact members, clutch mechanism operable from the fast pulley and through which the machine is driven, a treadle for controlling the clutch mechanism, and a lever having a portion arranged to engage the treadle and a portion engaged by the contact members.

In testimony whereof I have signed my name to this specification.

JOHN M. BENJAMIN.